(12) United States Patent
Rakshit

(10) Patent No.: US 12,459,126 B2
(45) Date of Patent: Nov. 4, 2025

(54) MAXIMIZING COLLABORATIVE EFFECTIVENESS AMONG MULTI-ROBOTS WITH DYNAMIC INTER-EXCHANGEABILITY

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 18/171,690

(22) Filed: Feb. 21, 2023

(65) Prior Publication Data

US 2024/0278431 A1  Aug. 22, 2024

(51) Int. Cl.
*B25J 9/16* (2006.01)
(52) U.S. Cl.
CPC ........... *B25J 9/1682* (2013.01); *B25J 9/1671* (2013.01)
(58) Field of Classification Search
CPC ............... B60W 60/001; G06Q 10/06; G06Q 10/06311; G06Q 10/087; G06Q 10/04; G06Q 10/08; G06Q 10/103; B25J 9/1682; B25J 9/1661; B25J 11/008; B25J 9/1671; G05B 19/418; G05B 2219/31336;
(Continued)

(56) References Cited

U.S. PATENT DOCUMENTS

2021/0107152 A1   4/2021   Honkote
2022/0245574 A1   8/2022   Cella et al.
(Continued)

FOREIGN PATENT DOCUMENTS

CN   112894811 B   9/2022
WO   2024/175480 A1   8/2024

OTHER PUBLICATIONS

Michalos et al: "The new assembly system paradigm," International Journal of Computer Integrated Manufacturing, Nov. 11, 2014, ISSN: 0951-192X (Print) 1362-3052 (Online), 11 pgs. (Year: 2014).*
(Continued)

*Primary Examiner* — Bao Long T Nguyen
*Assistant Examiner* — Alyse Tramanh Tran
(74) *Attorney, Agent, or Firm* — Jared C. Chaney

(57) ABSTRACT

A computer-implemented method, a computer program product, and a computer system for maximizing collaborative effectiveness among multi-robots with dynamic inter-exchangeability. A computer identifies inter-exchangeable parts among robots performing an activity in a multi-robotic ecosystem. A computer uses digital twin models to simulate scenarios of combining respective ones of the inter-exchangeable parts and respective ones of the robots. A computer identifies an optimum scenario in which collaborative effectiveness is maximized by exchanging the inter-exchangeable parts among the robots, based on results of digital twin model simulations. A computer, for the optimum scenario, identifies among the robots first robots whose inter-exchangeable parts are to be exchanged and one or more second robots that help the first robots exchange the inter-exchangeable parts. A computer instructs the first robots and the one or more second robots to perform physical exchange of the inter-exchangeable parts of the first robots.

20 Claims, 3 Drawing Sheets

(58) Field of Classification Search
CPC ...... G05B 2219/32009; G05B 23/0243; G05B 23/0283; G05B 23/0286; G05B 19/41865; G05B 2219/39146; G05D 1/0027; G05D 1/0291
See application file for complete search history.

(56) References Cited

U.S. PATENT DOCUMENTS

| | | | |
|---|---|---|---|
| 2022/0269285 A1 | 8/2022 | Chen et al. | |
| 2023/0219228 A1* | 7/2023 | Cella | B33Y 50/00 700/248 |

OTHER PUBLICATIONS

Badran et al., "Collaboration in Multi-Robot Systems", vol. 10, No. 22, Dec. 2015 ISSN 1819-6608, ARPN Journal of Engineering and Applied Sciences, 7 pages.

Dias et al., "Robust Multirobot Coordination in Dynamic Environments", Proceeding of the 2004 IEEE International Conference on Robotics & Automation, New Orleans, LA, Apr. 2004, 8 pages.

Li et al., "AR-assisted Digital Twin-enabled Robot Collaborative Manufacturing System with Human-in-the-loop", accessed on Jan. 6, 2023, 11 pages, <https://www.researchgate.net/publication/357897372>.

Parker, Lynne, E., "Reliability and Fault Tolerance in Collective Robot Systems", Oct. 5, 2011, PSP Book, Handbook-Collective-Robotics, 31 pages.

Ray, Partha Pratim, "Internet of Robotic Things: Concept, Technologies, and Challenges", © 2016 IEEE, 11 pages.

International Search Report, International Application No. PCT/EP2024/053948, May 24, 2024, 13 pgs.

Michalos et al: "The new assembly system paradigm," International Journal of Computer Integrated Manufacturing, ISSN: 0951-192X (Print) 1362-3052 (Online); https://www.tandfonline.com/loi/tcim20, Nov. 11, 2014, 11 pgs.

* cited by examiner

MAXIMIZING COLLABORATIVE EFFECTIVENESS AMONG MULTI-ROBOTS WITH DYNAMIC INTER-EXCHANGEABILITY

BACKGROUND

The present invention relates generally to collaboration of multi-robots, and more particularly to maximizing collaborative effectiveness among multi-robots with dynamic inter-exchangeability.

In a multi-robotic ecosystem, robots collaborate each other to perform an activity. In performing an individual task, the robots perform the activity in a collaborative manner. Different types of robots can have different types of capabilities, capacities, and effectiveness in the multi-robotic ecosystem. Different types of activities require different types of capabilities and capacities to perform the activities. The robots have different types of sensors and cameras, and they use the different types of sensors and cameras to access the surrounding and takes appropriate actions.

While the robots perform activities in the multi-robotic ecosystem, for various reasons, one or more sensors or input gathering systems may not work properly for one or more of the robots, or one or more modules of one or more of robots may have problems to perform activity effectively, such as a gripper of a robot has a problem. The robots are supposed to collaborate with each other to improve their collaborative effectiveness based on available robotic resources, so that the effectiveness of collaboration can be maximized.

Dias at al. ("Robust Multirobot Coordination in Dynamic Environments", in "IEEE International Conference on Robotics and Automation", 2004) discusses the robustness for any robot team when operating in dynamic environments. Parker ("Reliability and Fault Tolerance in Collective Robot Systems", Chapter 6 in "Handbook of Collective Robotics", 2001) provides an overview of the possible approaches that may be appropriate for achieving reliability and fault tolerance in a variety of multi-robot systems. Li et al. ("AR-assisted Digital Twin-enabled Robot Collaborative Manufacturing System with Human-in-the-loop", in "Robotics and Computer-Integrated Manufacturing", 2022) proposes a novel multi-robot collaborative manufacturing system with human-in-the-loop control by leveraging cutting-edge augmented reality and digital twin techniques. A disclosure (CN112894811A, 2021) discloses a distributed multi-robot intelligent control method and a control device based on a group intelligent multi-agent system. A disclosure (US20210107152A1, 2020) discloses a controller for obtaining a message from a task performing agent of a group of task performing agents allocated to a plurality of tasks. In a publication ("Collaboration in multi-robot systems", in "ARPN Journal of Engineering and Applied Sciences", 2015), Badran et al. discusses the structure and applications of multi robot systems and also discusses the techniques and algorithms used in the collaborative multi robot systems. In a publication ("Internet of Robotic Things: Concept, Technologies, and Challenges", in "IEEE Access", 2016), Ray describes architecture, key concepts, characteristics, and some of the technical challenges of Internet of Robotic Things.

SUMMARY

Embodiments of the present invention provide a computer-implemented method, a computer program product, and a computer system for maximizing collaborative effectiveness among multi-robots with dynamic inter-exchangeability. By considering inter-exchangeability of parts of the robots and physically exchanging inter-exchangeable parts among the robots, the computer-implemented method, the computer program product, or the computer system maximizes collaborative effectiveness among robots performing an activity in a multi-robotic ecosystem.

In one aspect, a computer-implemented method for maximizing collaborative effectiveness among multi-robots with dynamic inter-exchangeability is provided. The computer-implemented method includes identifying inter-exchangeable parts among robots performing an activity in a multi-robotic ecosystem. The computer-implemented method further includes using digital twin models to simulate scenarios of combining respective ones of the inter-exchangeable parts and respective ones of the robots. The computer-implemented method further includes identifying an optimum scenario in which collaborative effectiveness is maximized by exchanging the inter-exchangeable parts among the robots, based on results of digital twin model simulations. The computer-implemented method further includes, for the optimum scenario, identifying among the robots first robots whose inter-exchangeable parts are to be exchanged. The computer-implemented method further includes, for the optimum scenario, identifying among the robots one or more second robots that help the first robots exchange the inter-exchangeable parts. The computer-implemented method further includes instructing the first robots and the one or more second robots to perform physical exchange of the inter-exchangeable parts of the first robots.

The computer-implemented method further includes performing a cost-benefit analysis for each of the scenarios, where identifying the optimum scenario is further based on cost-benefit analyses for respective ones of the scenarios.

The computer-implemented method further includes: identifying the activity; identifying a specification of the activity, where the specification includes tasks and a volume of the tasks; identifying a type of the activity; and identifying a volume of the activity.

The computer-implemented method further includes identifying the digital twin models for the respective ones of the inter-exchangeable parts and for the respective ones of the robots. The computer-implemented method further includes: in the digital twin model simulations, evaluating capacities of the respective ones of the robots and time required for exchanging the inter-exchangeable parts among the robots. The computer-implemented method further includes determining, in digital twin model simulations, whether capabilities of the inter-exchangeable parts or capacities of the robots are reduced by exchanging the inter-exchangeable parts among the robots.

In another aspect, a computer program product for maximizing collaborative effectiveness among multi-robots with dynamic inter-exchangeability is provided. The computer program product comprises a computer readable storage medium having program instructions embodied therewith, and the program instructions are executable by one or more processors. The program instructions are executable to: identify inter-exchangeable parts among robots performing an activity in a multi-robotic ecosystem; use digital twin models to simulate scenarios of combining respective ones of the inter-exchangeable parts and respective ones of the robots; identify an optimum scenario in which collaborative effectiveness is maximized by exchanging the inter-exchangeable parts among the robots, based on results of digital twin model simulations; for the optimum scenario, identify among the robots first robots whose inter-exchangeable parts are to be exchanged; for the optimum scenario, identify among the robots one or more second robots that help the first robots exchange the inter-exchangeable parts; and instruct the first robots and the one or more second robots to perform physical exchange of the inter-exchangeable parts of the first robots.

In yet another aspect, a computer system for maximizing collaborative effectiveness among multi-robots with dynamic inter-exchangeability is provided. The computer system comprises one or more processors, one or more computer readable tangible storage devices, and program instructions stored on at least one of the one or more computer readable tangible storage devices for execution by at least one of the one or more processors. The program instructions are executable to identify inter-exchangeable parts among robots performing an activity in a multi-robotic ecosystem. The program instructions are further executable to use digital twin models to simulate scenarios of combining respective ones of the inter-exchangeable parts and respective ones of the robots. The program instructions are further executable to identify an optimum scenario in which collaborative effectiveness is maximized by exchanging the inter-exchangeable parts among the robots, based on results of digital twin model simulations. The program instructions are further executable to, for the optimum scenario, identify among the robots first robots whose inter-exchangeable parts are to be exchanged. The program instructions are further executable to, for the optimum scenario, identify among the robots one or more second robots that help the first robots exchange the inter-exchangeable parts. The program instructions are further executable to instruct the first robots and the one or more second robots to perform physical exchange of the inter-exchangeable parts of the first robots.

The computer program product or the computer system further includes the program instructions executable to perform a cost-benefit analysis for each of the scenarios, where identifying the optimum scenario is further based on cost-benefit analyses for respective ones of the scenarios.

The computer program product or the computer system further includes the program instructions executable to: identify the activity; identify a specification of the activity, where the specification includes tasks and a volume of the tasks; identify a type of the activity; and identify a volume of the activity.

The computer program product or the computer system further includes the program instructions executable to identifying the digital twin models for the respective ones of the inter-exchangeable parts and for the respective ones of the robots. In the digital twin model simulations, the program instructions are further executable to evaluate capacities of the respective ones of the robots and evaluate time required for exchanging the inter-exchangeable parts among the robots. In the digital twin model simulations, the program instructions are further executable to determine whether capabilities of the inter-exchangeable parts or capacities of the robots are reduced by exchanging the inter-exchangeable parts among the robots.

DETAILED DESCRIPTION

Embodiments of the present invention discloses a system for maximizing collaborative effectiveness among multi-robots with dynamic inter-exchangeability. While the robots preform activities in a multi-robotic ecosystem, based on the context of an activity in the multi-robotic ecosystem, the disclosed system in the present invention identifies inter-exchangeability of robotic parts or resources of the robots. The disclosed system evaluates what types of inter-exchangeability of different parts or resources can be performed among different robots. The disclosed system identifies what types of inter-exchangeability can maximize the collaborative effectiveness, and accordingly the disclosed system instructs some involved robots to physically exchange inter-exchangeable parts or resources to maximize the collaborative effectiveness.

The disclosed system analyzes the activity performed by the robots, current digital twin models simulating the robots, and associated robotic parts or resources of each robot. Accordingly, the disclosed system identifies how the robotic systems are to be re-modelled with inter-exchangeability of different parts or resources so that the activity can be completed with optimum cost, optimum timing, a high level of safety, etc.

In embodiments of the present invention, based on digital twin simulation results, the disclosed system identifies participating robots for inter-exchangeability and accordingly uses one or more other robots to perform the inter-exchangeability, so that the collaborative effectiveness of performing the activity is maximized. The disclosed system considers time and resource required for the inter-exchangeability, and the disclosed system evaluates the time and resource against the gain in the collaborative effectiveness; accordingly, the robotic systems will execute inter-exchangeability of different resources or parts.

Figure 1:
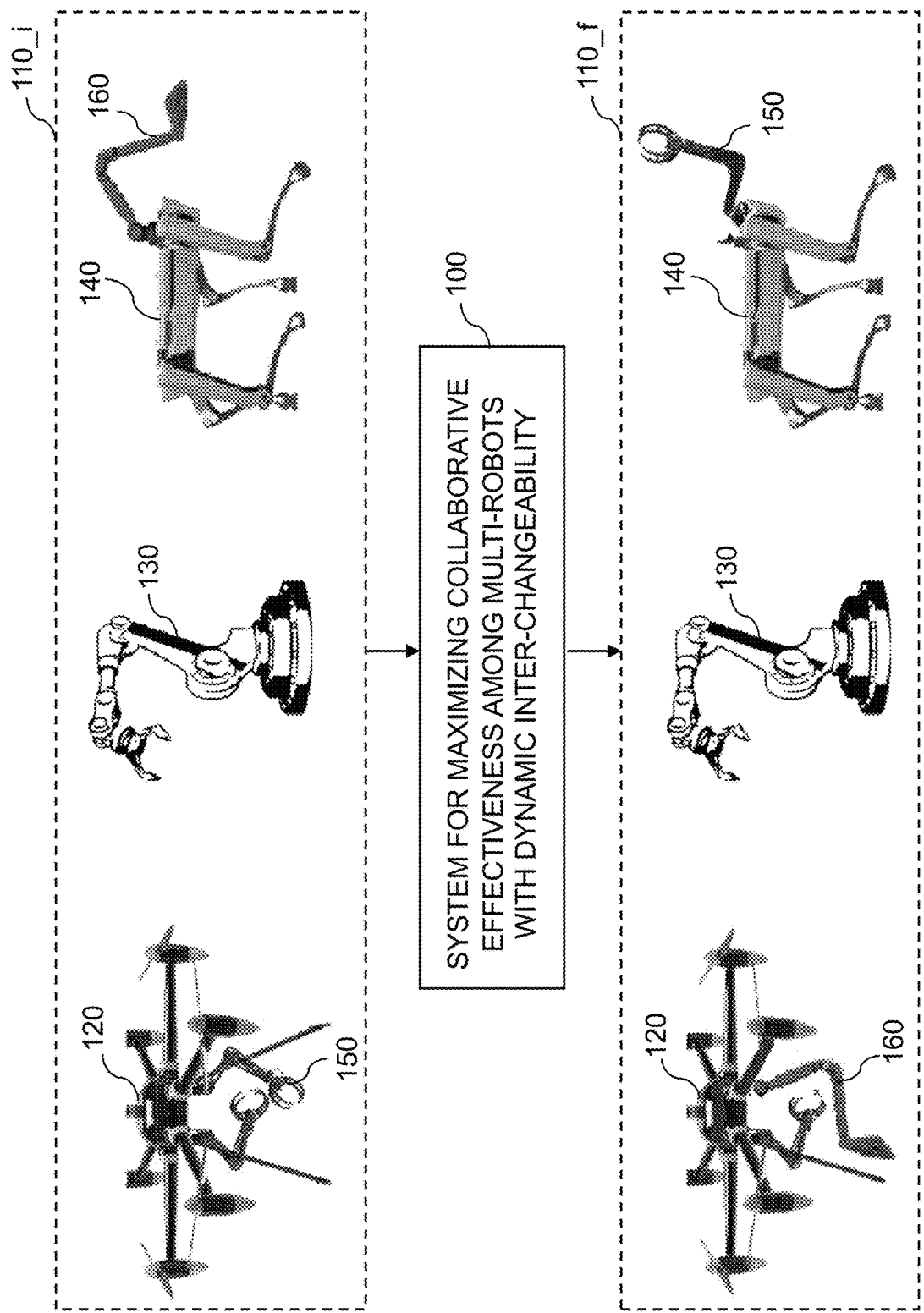
FIG. 1 illustrates a system for maximizing collaborative effectiveness among multi-robots with dynamic inter-exchangeability and a multi-robotic ecosystem, in accordance with one embodiment of the present invention.

FIG. 1 illustrates system 100 for maximizing collaborative effectiveness among multi-robots with dynamic inter-exchangeability and multi-robotic ecosystem 110_i or 110_f, in accordance with one embodiment of the present invention. System 100 is the disclosed system in the present invention. System 100 is situated on a computer or server (such as computer 601 in FIG. 6).

Multi-robotic ecosystem 110_i or 110_f includes robot 120 (e.g., a flying robot), robot 130, and robot 130 (e.g., an agile mobile robot). Multi-robotic ecosystem 110_i is an initial state of the multi-robotic ecosystem, which is a state before maximizing collaborative effectiveness performed by system 100. Multi-robotic ecosystem 110_f is a final state of the multi-robotic ecosystem, which is a state after maximizing collaborative effectiveness performed by system 100. System 100, based on digital twin model simulations and cost-effect analyses, identifies an optimum scenario that maximizing collaborative effectiveness (e.g., an activity performed by the robots can be completed with optimum cost, optimum timing, and a high level of safety) by exchanging the inter-exchangeable parts among the robots. System 100 identifies some robots whose inter-exchangeable parts are to be exchanged among them and identifies other robots that help in exchanging the inter-exchangeable parts. For example, in the initial state of the multi-robotic ecosystem (110_*i*), robot 120 has inter-exchangeable part 150 and robot 140 has inter-exchangeable part 160. System 100 identifies that the collaborative effectiveness in the multi-robotic ecosystem can be maximized by exchanging inter-exchangeable part 150 and inter-exchangeable part 160 between robot 120 and robot 140. To maximize the collaborative effectiveness of the multi-robotic ecosystem, inter-exchangeable part 150 and inter-exchangeable part 160 are to be exchanged. System 100 may further identify robot 130 help robot 120 and robot 140 to exchange inter-exchangeable part 150 and inter-exchangeable part 160.

For example, system 100 sends instructions (or commands) to robot 120, robot 130, and robot 140 to physically exchange inter-exchangeable part 150 and inter-exchangeable part 160 between robot 120 and robot 140. Inter-exchangeable part 150 initially on robot 120 is physically transferred to robot 140, while inter-exchangeable part 160 initially on robot 140 is physically transferred to robot 120. Robot 130 helps by performing the physical exchange of inter-exchangeable part 150 and inter-exchangeable part 160 between robot 120 and robot 140. After completing the physical exchange, the final state of the multi-robotic ecosystem (110_*f*) is achieved; in the final state of the multi-robotic ecosystem (110_*f*), the effectiveness of collaboration of the robots is maximized.

Figure 2:
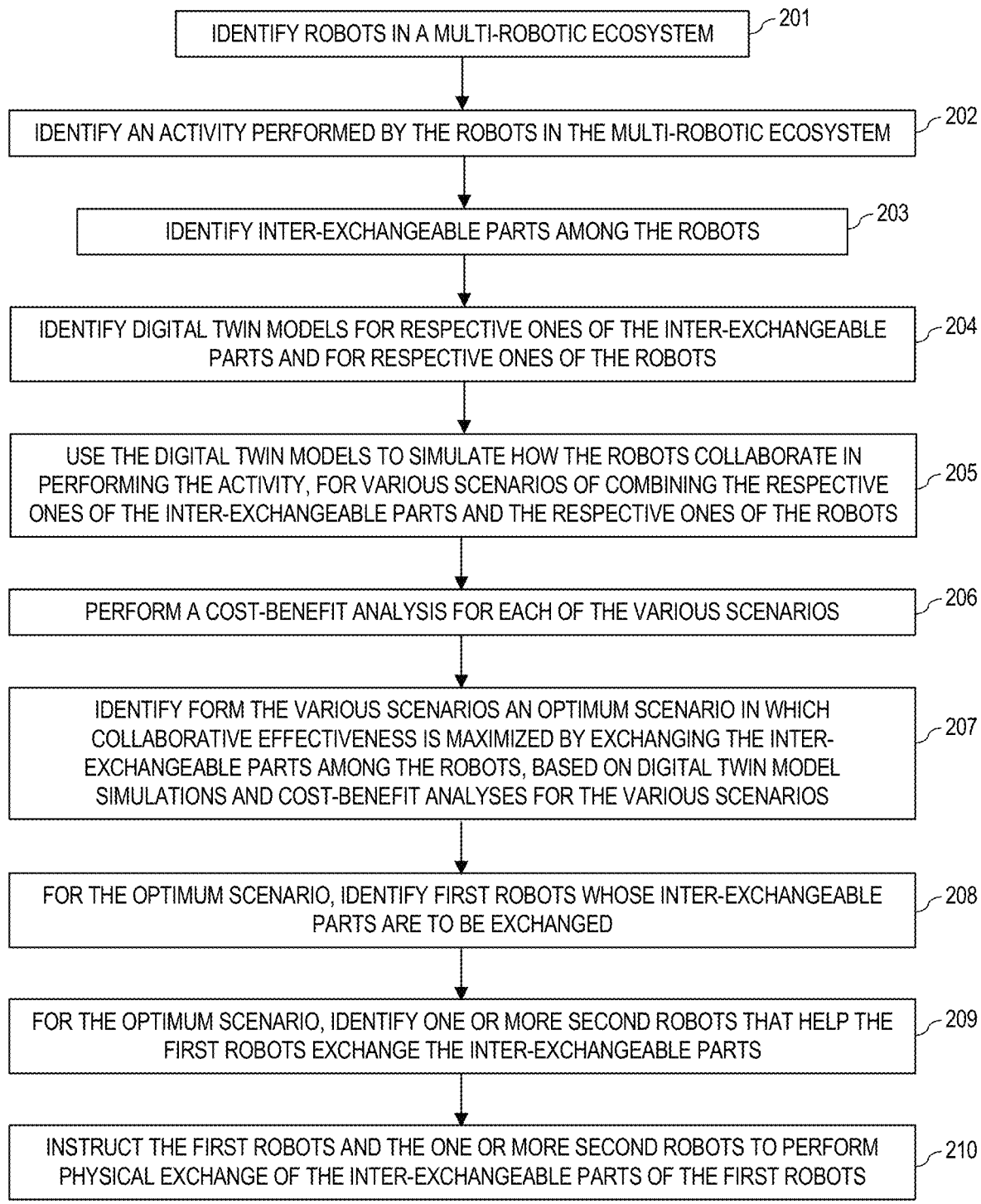
FIG. 2 is a flowchart showing operational steps of maximizing collaborative effectiveness among multi-robots with dynamic inter-exchangeability, in accordance with one embodiment of the present invention.

FIG. 2 is a flowchart showing operational steps of maximizing collaborative effectiveness among multi-robots with dynamic inter-exchangeability, in accordance with one embodiment of the present invention. The operational steps are implemented by system 100 (shown in FIG. 1) which is situated on a computer or server (such as computer 601 in FIG. 6).

In step 201, the computer or server identifies robots in a multi-robotic ecosystem. In the example shown in FIG. 1, system 100 on the computer or server identifies robot 120, robot 130, and robot 140 in multi-robotic ecosystem 110_*i*.

In step 202, the computer or server identifies an activity performed by the robots in the multi-robotic ecosystem. The robots are deployed in an area of the activity to perform the activity in the surrounding. The computer or server identifies the activity that is to be performed by the robots in the activity area. The computer or server identifies the specification of the activity; the specification includes tasks and a volume of different tasks. The computer or server identifies a type of the activity. The computer or server identify a volume of the activity that are performed by the robots.

In step 203, the computer or server identifies inter-exchangeable parts among the robots. The inter-exchangeable parts among the robotic systems can be grippers, sensors, hydraulic systems, battery, etc. The robots in the multi-robotic ecosystem have inter-exchangeability capability, it means that one or more parts of one robotic system can be transferred to another robotic system. In the example shown in FIG. 1, robot 120 has inter-exchangeable part 150 that can be transferred to robot 140, and robot 140 has inter-exchangeable part 160 that can be transferred to robot 120.

In step 204, the computer or server identifies digital twin models for respective ones of the inter-exchangeable parts and for respective ones of the robots. The inter-exchangeable parts are identified uniquely and they have respective ones of digital twin models; each inter-exchangeable part has one specific digital twin model. Furthermore, each of the robots has one specific digital twin model.

In step 205, the computer or server uses the digital twin models to simulate how the robots collaborate in performing the activity, for various scenarios of combining the respective ones of the inter-exchangeable parts and the respective ones of the robots. The computer or server performs digital twin model simulations for respective ones of possible combinations of different inter-exchangeable parts and different robots. In the digital twin model simulations, the computer or server evaluates capabilities of different robotic systems. In the digital twin model simulations, the computer or server evaluates how much time will be required for performing inter-exchangeability of different parts. In the digital twin model simulations, the computer or server also identifies appropriate inter-exchangeability of spare parts for appropriate robots. Through the digital twin model simulations for possible combinations, the computer or server determines whether there is any problem in performing the inter-exchangeability; for example, the computer or server determines whether capabilities of one or more inter-exchangeable parts or one or more robots are reduced by exchanging the inter-exchangeable parts among the robots.

In step 206, the computer or server performs a cost-benefit analysis for each of the various scenarios. In step 207, the computer or server identifies, form the various scenarios, an optimum scenario in which collaborative effectiveness is maximized by exchanging the inter-exchangeable parts among the robots, based on the digital twin model simulations and cost-benefit analyses for the various scenarios. In the example shown in FIG. 1, system 100 on the computer or server identifies that exchanging inter-exchangeable part 150 and inter-exchangeable part 160 between robot 120 and robot 140 is the optimum scenario and maximizes the collaborative effectiveness.

For the optimum scenario, in step 208, the computer or server identifies first robots whose inter-exchangeable parts are to be exchanged. In the example shown in FIG. 1, system 100 on the computer or server identifies robot 120 and robot 140 as the first robots and their exchanging inter-exchangeable part 150 and inter-exchangeable part 160 are to be exchanged.

For the optimum scenario, in step 209, the computer or server, identifies one or more second robots that help the first robots exchange the inter-exchangeable parts. In the example shown in FIG. 1, system 100 on the computer or server identifies robot 130 as a robot that helps robot 120 and robot 140 exchange inter-exchangeable part 150 and inter-exchangeable part 160. Robot 130 performs the exchange inter-exchangeable part 150 and inter-exchangeable part 160 between robot 120 and robot 140. In other embodiments, one or more of the first robots may be identified as the one or more second robots; in other words, one or more from the first robots may help the first robots exchange the inter-exchangeable parts.

In step 210, the computer or server instructs the first robots and the one or more second robots to perform physical exchange of the inter-exchangeable parts of the first robots. Upon receiving one or more instructions (or commands) from the computer or server being received by the first robots and the one or more second robots, the physical exchange of the inter-exchangeable parts among the first robots are performed by the one or more second robots. In the example shown in FIG. 1, system 100 on the computer or server sends one or more instructions (or commands) to robot 120, robot 130, and robot 140. Upon receiving the one or more instructions (or commands), robot 130 physically exchange inter-exchangeable part 150 and inter-exchangeable part 160 between robot 120 and robot 140.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 3:
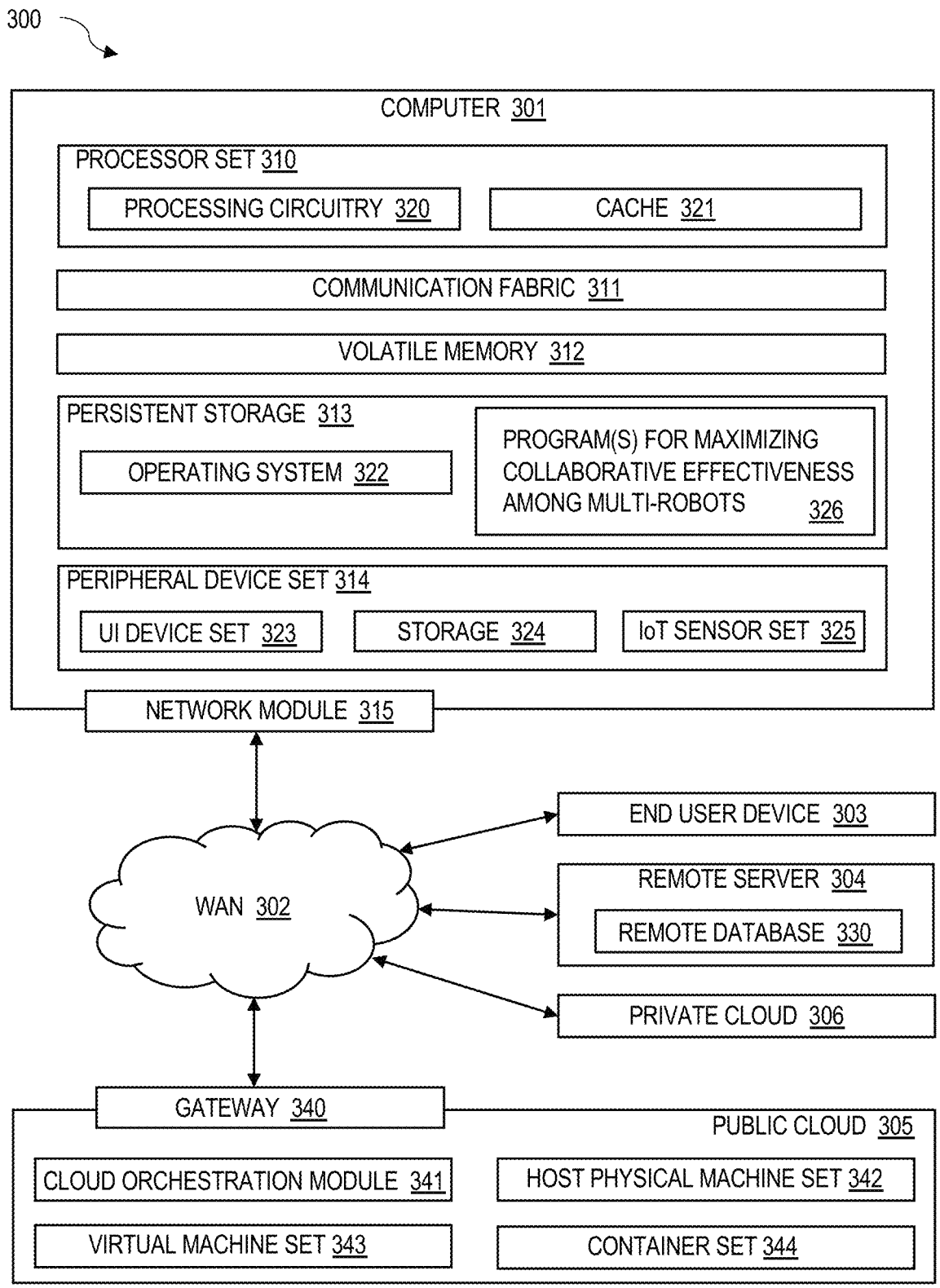
FIG. 3 is a systematic diagram illustrating an example of an environment for the execution of at least some of the computer code involved in maximizing collaborative effectiveness among multi-robots with dynamic inter-exchangeability, in accordance with one embodiment of the present invention.

In FIG. 3, computing environment 300 contains an example of an environment for the execution of at least some of the computer code involved in performing the inventive methods, such as program(s) 326 for maximizing collaborative effectiveness among multi-robots with dynamic inter-exchangeability. In addition to block 326, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 326, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 326 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in block 326 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

What is claimed is:

1. A computer-implemented method for maximizing collaborative effectiveness among multi-robots with dynamic inter-exchangeability, the method comprising:
   identifying inter-exchangeable parts among robots performing an activity in a multi-robotic ecosystem containing two or more types of robots;
   using digital twin models to simulate scenarios of combining respective ones of the inter-exchangeable parts of a first type of robot to a second type of robot;
   identifying an optimum scenario in which collaborative effectiveness is maximized by exchanging the inter-exchangeable parts among the first type of robot to the second type of robot, based on results of digital twin model simulations;
   for the optimum scenario, identifying, among the robots, first robots whose inter-exchangeable parts are to be exchanged;
   for the optimum scenario, identifying, among the robots, one or more second robots that help the first robots exchange the inter-exchangeable parts; and
   instructing the first robots and the one or more second robots to perform physical exchange of the inter-exchangeable parts of the first robots.

2. The computer-implemented method of claim 1, further comprising:
   performing a cost-benefit analysis for each of the scenarios; and
   wherein identifying the optimum scenario is further based on cost-benefit analyses for respective ones of the scenarios.

3. The computer-implemented method of claim 1, further comprising:
   identifying the activity;
   identifying a specification of the activity, the specification including tasks and a volume of the tasks;
   identifying a type of the activity; and
   identifying a volume of the activity.

4. The computer-implemented method of claim 1, further comprising:
   identifying the digital twin models for the respective ones of the inter-exchangeable parts and for the respective ones of the robots.

5. The computer-implemented method of claim 1, further comprising:
   evaluating, in the digital twin model simulations, capacities of the respective ones of the robots; and
   evaluating, in the digital twin model simulations, time required for exchanging the inter-exchangeable parts among the robots.

6. The computer-implemented method of claim 1, further comprising:
   determining, in the digital twin model simulations, whether capabilities of the inter-exchangeable parts or capacities of the robots are reduced by exchanging the inter-exchangeable parts among the robots.

7. The computer-implemented method of claim 1, further comprising:
   identifying inter-exchangeability of spare parts for the robots.

8. A computer program product for maximizing collaborative effectiveness among multi-robots with dynamic inter-exchangeability, the computer program product comprising a computer readable storage medium having program instructions stored therewith, the program instructions executable by one or more processors, the program instructions executable to:
   identify inter-exchangeable parts among robots performing an activity in a multi-robotic ecosystem containing two or more types of robots;
   use digital twin models to simulate scenarios of combining respective ones of the inter-exchangeable parts of a first type of robot to a second type of robot;
   identify an optimum scenario in which collaborative effectiveness is maximized by exchanging the inter-exchangeable parts among the first type of robot to the second type of robot, based on results of digital twin model simulations;
   for the optimum scenario, identify, among the robots, first robots whose inter-exchangeable parts are to be exchanged;
   for the optimum scenario, identify, among the robots, one or more second robots that help the first robots exchange the inter-exchangeable parts; and
   instruct the first robots and the one or more second robots to perform physical exchange of the inter-exchangeable parts of the first robots.

9. The computer program product of claim 8, further comprising the program instructions stored on the computer readable storage medium, the program instructions executable to:
   perform a cost-benefit analysis for each of the scenarios; and wherein identifying the optimum scenario is further based on cost-benefit analyses for respective ones of the scenarios.

10. The computer program product of claim 8, further comprising the program instructions stored on the computer readable storage medium, the program instructions executable to:
   identify the activity;
   identify a specification of the activity, the specification including tasks and a volume of the tasks;
   identify a type of the activity; and
   identify a volume of the activity.

11. The computer program product of claim 8, further comprising the program instructions stored on the computer readable storage medium, the program instructions executable to:
   identify the digital twin models for the respective ones of the inter-exchangeable parts and for the respective ones of the robots.

12. The computer program product of claim 8, further comprising the program instructions stored on the computer readable storage medium, the program instructions executable to:
   evaluate, in the digital twin model simulations, capacities of the respective ones of the robots; and
   evaluate, in the digital twin model simulations, time required for exchanging the inter-exchangeable parts among the robots.

13. The computer program product of claim 8, further comprising the program instructions stored on the computer readable storage medium, the program instructions executable to:
   determine, in the digital twin model simulations, whether capabilities of the inter-exchangeable parts or capacities of the robots are reduced by exchanging the inter-exchangeable parts among the robots.

14. The computer program product of claim 8, further comprising the program instructions stored on the computer readable storage medium, the program instructions executable to:
   identify inter-exchangeability of spare parts for the robots.

15. A computer system for maximizing collaborative effectiveness among multi-robots with dynamic inter-exchangeability, the computer system comprising one or more processors, one or more computer readable tangible storage devices, and program instructions stored on at least one of the one or more computer readable tangible storage devices for execution by at least one of the one or more processors, the program instructions executable to:
   identify inter-exchangeable parts among robots performing an activity in a multi-robotic ecosystem containing two or more types of robots;
   use digital twin models to simulate scenarios of combining respective ones of the inter-exchangeable parts of a first type of robot to a second type of robot;
   identify an optimum scenario in which collaborative effectiveness is maximized by exchanging the inter-exchangeable parts among the first type of robot to the second type of robot, based on results of digital twin model simulations;
   for the optimum scenario, identify, among the robots, first robots whose inter-exchangeable parts are to be exchanged;
   for the optimum scenario, identify, among the robots, one or more second robots that help the first robots exchange the inter-exchangeable parts; and
   instruct the first robots and the one or more second robots to perform physical exchange of the inter-exchangeable parts of the first robots.

16. The computer system of claim 15, further comprising the program instructions stored on the at least one of the one or more computer readable tangible storage devices, the program instruction executable to:
   perform a cost-benefit analysis for each of the scenarios; and
   wherein identifying the optimum scenario is further based on cost-benefit analyses for respective ones of the scenarios.

17. The computer system of claim 15, further comprising the program instructions stored on the at least one of the one or more computer readable tangible storage devices, the program instruction executable to:
   identify the activity;
   identify a specification of the activity, the specification including tasks and a volume of the tasks;
   identify a type of the activity; and
   identify a volume of the activity.

18. The computer system of claim 15, further comprising the program instructions stored on the at least one of the one or more computer readable tangible storage devices, the program instruction executable to:
   identify the digital twin models for the respective ones of the inter-exchangeable parts and for the respective ones of the robots.

19. The computer system of claim 15, further comprising the program instructions stored on the at least one of the one or more computer readable tangible storage devices, the program instruction executable to:
   evaluate, in the digital twin model simulations, capacities of the respective ones of the robots;
   evaluate, in the digital twin model simulations, time required for exchanging the inter-exchangeable parts among the robots; and
   determine, in the digital twin model simulations, whether capabilities of the inter-exchangeable parts or capacities of the robots are reduced by exchanging the inter-exchangeable parts among the robots.

20. The computer system of claim 15, further comprising the program instructions stored on the at least one of the one or more computer readable tangible storage devices, the program instruction executable to:
   identify inter-exchangeability of spare parts for the robots.

* * * * *